(12) United States Patent
Han et al.

(10) Patent No.: US 11,245,881 B2
(45) Date of Patent: Feb. 8, 2022

(54) METHOD AND APPARATUS FOR CORRECTING COLOR CONVERGENCE ERROR

(71) Applicant: GOERTEK INC., Shandong (CN)

(72) Inventors: Xinxin Han, Weifang (CN); Nanjing Dong, Weifang (CN); Debo Sun, Weifang (CN)

(73) Assignee: GOERTEK INC., Weifang (CN)

( * ) Notice: Subject to any disclaimer, the term of this patent is extended or adjusted under 35 U.S.C. 154(b) by 0 days.

(21) Appl. No.: 17/051,729

(22) PCT Filed: Sep. 6, 2018

(86) PCT No.: PCT/CN2018/104394
§ 371 (c)(1),
(2) Date: Oct. 29, 2020

(87) PCT Pub. No.: WO2019/227759
PCT Pub. Date: Dec. 5, 2019

(65) Prior Publication Data
US 2021/0235047 A1    Jul. 29, 2021

(30) Foreign Application Priority Data

May 31, 2018  (CN) .......................... 201810556346.8

(51) Int. Cl.
*H04N 9/31*  (2006.01)
*G03B 21/20*  (2006.01)
*G03B 21/56*  (2006.01)

(52) U.S. Cl.
CPC ......... *H04N 9/317* (2013.01); *G03B 21/2006* (2013.01); *G03B 21/567* (2013.01); *H04N 9/3105* (2013.01); *H04N 9/3185* (2013.01)

(58) Field of Classification Search
CPC .......................... G03B 21/147; G03B 21/208; G03B 21/2006; G03B 21/2013; G03B 21/2033;
(Continued)

(56) References Cited

U.S. PATENT DOCUMENTS 5,313,578 A    5/1994  Handorf
6,196,687 B1   3/2001  Smith
(Continued)

FOREIGN PATENT DOCUMENTS

CN    1347622 A    5/2002
CN    1668113 A    9/2005
(Continued)

OTHER PUBLICATIONS

Chinese Office Action dated Oct. 9, 2019 received in application No. 2018105563468.
(Continued)

*Primary Examiner* — Sultan Chowdhury
(74) *Attorney, Agent, or Firm* — Maschoff Brennan

(57) ABSTRACT

Provided are a method and an apparatus for correcting a color convergence error. The method includes: in a dark room environment, collecting a projection light point on a projection screen projected by a projection system, to obtain a projection image; adjusting the test pattern, so that a first projection light point corresponding to the white point of a first coordinate on the test pattern after being projected by a first color light source is located in a center of the projection image; obtaining a second and/or a third projection light points corresponding to the white point of the first coordinate after being projected by a second and/or a third color light sources from the projection image; and adjusting an assembly parameter of the projection system according to a position of the second and/or the third projection light points and a position of the first projection light point.

10 Claims, 3 Drawing Sheets

(58) Field of Classification Search
CPC .. G03B 21/2053; G03B 21/2066; H04N 9/69; H04N 9/73; H04N 9/317; H04N 9/646; H04N 9/735; H04N 9/3105; H04N 9/3185; H04N 9/3194; H04N 1/50; H04N 1/56; H04N 1/603; H04N 1/6044; H04N 1/6033; G09G 2320/066; G09G 2320/0626; G09G 2320/0666; G09G 2320/0673; G09G 2320/0686; G09G 2320/0693

See application file for complete search history.

(56) References Cited

U.S. PATENT DOCUMENTS

| | | | |
|---|---|---|---|
| 7,420,591 B2 | 9/2008 | Cho | |
| 8,439,505 B2 | 5/2013 | Yoshizawa | |
| 2003/0234794 A1* | 12/2003 | Kanai | G09G 5/04 345/600 |
| 2004/0021672 A1* | 2/2004 | Wada | H04N 17/045 345/591 |
| 2005/0200702 A1 | 9/2005 | Cho | |
| 2011/0292352 A1 | 12/2011 | Yoshizawa | |
| 2013/0093783 A1* | 4/2013 | Sullivan | G06T 11/001 345/601 |
| 2018/0160086 A1* | 6/2018 | Naganuma | H04N 9/31 |
| 2019/0124325 A1* | 4/2019 | Lv | G06T 7/90 |

FOREIGN PATENT DOCUMENTS

| | | |
|---|---|---|
| CN | 101369090 A | 2/2009 |
| CN | 201986084 U | 9/2011 |
| CN | 102263919 A | 11/2011 |
| CN | 106162128 A | 11/2016 |
| CN | 107911680 A | 4/2018 |
| JP | H05127620 A | 5/1993 |

OTHER PUBLICATIONS

Chinese Office Action dated Apr. 26, 2020 received in application No. 2018105563468.

* cited by examiner in a dark room environment, collecting a projection light point on a projection screen projected by a projection system, to obtain a projection image; where the projection system projects a test pattern containing an array of a white point by using RGB three-color light source — 101 adjusting the test pattern, so that a first projection light point corresponding to the white point of a first coordinate on the test pattern after being projected by a first color light source is located in a center of the projection image — 102 obtaining a second projection light point and/or a third projection light point corresponding to the white point of the first coordinate after being projected by a second color light source and/or a third color light source from the projection image — 103 obtaining a second projection light point and/or a third projection light point corresponding to the white point of the first coordinate after being projected by a second color light source and/or a third color light source from the projection image — 104

FIG. 1

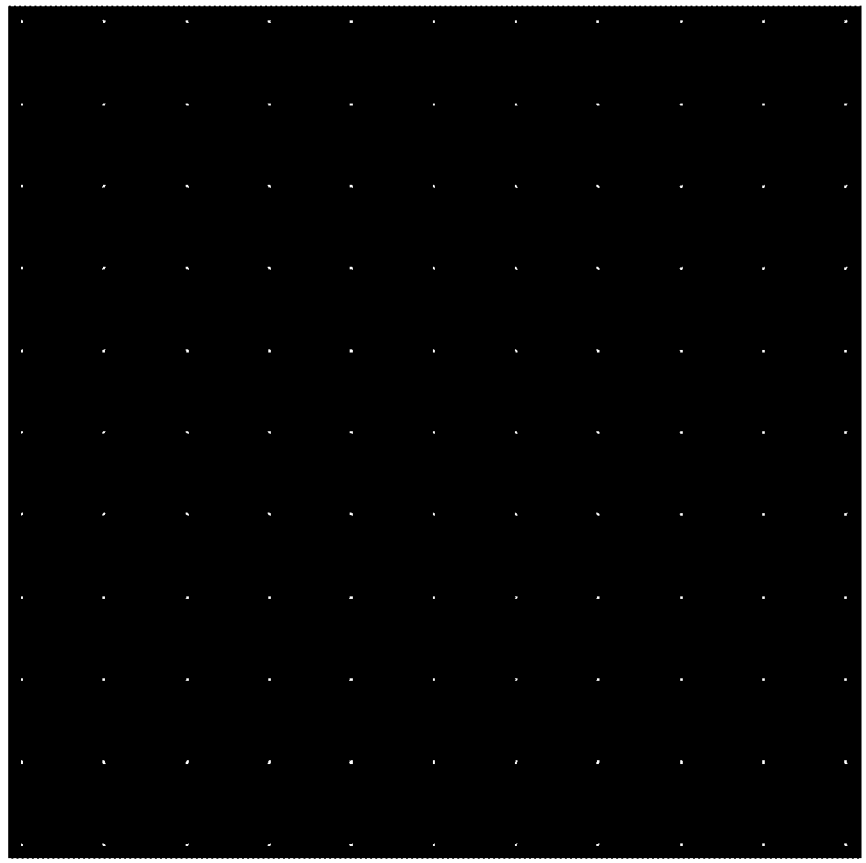

FIG. 2

METHOD AND APPARATUS FOR CORRECTING COLOR CONVERGENCE ERROR

CROSS-REFERENCE TO RELATED APPLICATIONS

The present disclosure refers to Chinese Patent Application No. 2018105563468, filed on May 31, 2018, entitled "Method and Apparatus for Correcting Color Convergence Error", which is hereby incorporated by reference in its entirety.

TECHNICAL FIELD

The present disclosure relates to the field of assembling technology, and in particular a method and an apparatus for correcting a color convergence error.

BACKGROUND

In order to solve the defect of insufficient color gamut space in traditional display technologies, display technologies based on red (R), green (G), and blue (B) light sources have emerged, such as three-chip reflective/projection display technology, laser scanning display technology and laser projection display technology, etc. These display technologies based on RGB three-color light source can truly reproduce the rich and gorgeous colors of the objective world and provide more shocking color expression.

The display technologies based on RGB three-color light sources usually include three light sources, and each light source corresponds to one of the three primary colors. A variety of colored lights can be obtained after the lights emitted by the three light sources are mixed in different proportions.

However, due to the mechanical error of the system assembly and the chromatic aberration of the optical component, in the image displayed by the display technology based on the RGB three-color light source, there may be overlapping error in the red, green, and blue pixels, which will affect the clarity of the image. In view of this, a method for correcting the color convergence error needs to be proposed urgently.

SUMMARY

Various aspects of the present disclosure provide a method and an apparatus for correcting a color convergence error, to improve the imaging quality of the projection optical module.

The present disclosure provides a method for correcting a color convergence error, including: in a dark room environment, collecting a projection light point on a projection screen projected by a projection system, to obtain a projection image; wherein the projection system projects a test pattern containing an array of a white point by using RGB three-color light source; adjusting the test pattern, so that a first projection light point corresponding to the white point of a first coordinate on the test pattern after being projected by a first color light source is located in a center of the projection image; obtaining a second projection light point and/or a third projection light point corresponding to the white point of the first coordinate after being projected by a second color light source and/or a third color light source from the projection image; and adjusting an assembly parameter of the projection system according to a position of the second projection light point and/or the third projection light point and a position of the first projection light point.

Further optionally, the adjusting the assembly parameter of the projection system according to an offset of the second projection light point and/or the third projection light point relative to the first projection light point includes: calculating a center-of-mass coordinate of the second projection light point and/or the third projection light point; judging whether the second projection light point and/or the third projection the light point superposes with the first projection light point according to the center-of-mass coordinate; and if no, adjusting a position of the second color light source and/or the third color light source accordingly, so that the second projection light point and/or the third projection light point superposes with the first projection light point.

Further optionally, before the collecting the projection light point on the projection screen projected by the projection system, the method further includes: determining a minimum distance between two adjacent projection light points received by the projection screen according to a size of a photosensitive element on a camera collecting the projection image; and designing reversely an array distance corresponding to the array of the white point on the test pattern according to the minimum distance between the two projection light points, a magnification of the projection system, and a distance between the projection screen and the projection system.

Further optionally, the minimum distance between two adjacent projection light points received by the projection screen is greater than the size of the photosensitive element on the camera.

Further optionally, wherein the adjusting the test pattern, so that the first projection light point corresponding to the white point of the first coordinate on the test pattern after being projected by the first color light source is located in the center of the projection image, includes: after the first color light source displays the test pattern, judging whether there is the first projection light point on the collected projection image; if yes, calculating the center-of-mass coordinate of the first projection light point, and judging whether the first projection light point is located at the center of the projection image according to the center-of-mass coordinate; and if no, adjusting the test pattern according to the center-of-mass coordinate, so that the first projection light point superposes with the center of the projection image.

The present disclosure further provides an apparatus for correcting a color convergence error, including: an image collecting module, configured to collect a projection light point on a projection screen projected by a projection system, to obtain a projection image; wherein the projection system projects a test pattern containing an array of a white point by using RGB three-color light source; an adjusting module, configured to adjust the test pattern, so that a first projection light point corresponding to the white point of a first coordinate on the test pattern after being projected by a first color light source is located in a center of the projection image; the image collecting module, further configured to obtain a second projection light point and/or a third projection light point corresponding to the white point of the first coordinate after being projected by a second color light source and/or a third color light source from the projection image; and an error correcting module, configured to adjust an assembly parameter of the projection system according to a position of the second projection light point and/or the third projection light point and a position of the first projection light point.

Further optionally, the error correcting module is specifically configured to: calculate a center-of-mass coordinate of the second projection light point and/or the third projection light point; judge whether the second projection light point and/or the third projection the light point superposes with the first projection light point according to the center-of-mass coordinate; and if no, adjust a position of the second color light source and/or the third color light source accordingly, so that the second projection light point and/or the third projection light point superposes with the first projection light point.

Further optionally, the image collecting module is further configured to: before collecting the projection light point on the projection screen projected by the projection system, determine a minimum distance between two adjacent projection light points received by the projection screen according to a size of a photosensitive element on a camera collecting the projection image; and design reversely an array distance corresponding to the array of the white point on the test pattern according to the minimum distance between the two projection light points, a magnification of the projection system, and a distance between the projection screen and the projection system.

Further optionally, the minimum distance between two adjacent projection light points received by the projection screen is greater than the size of the photosensitive element on the camera.

Further optionally, the adjusting module is specifically configured to: after the first color light source displays the test pattern, judge whether there is the first projection light point on the collected projection image; if yes, calculate the center-of-mass coordinate of the first projection light point, and judge whether the first projection light point is located at the center of the projection image according to the center-of-mass coordinate; and if no, adjust the test pattern according to the center-of-mass coordinate, so that the first projection light point superposes with the center of the projection image.

In the present disclosure, in the dark room environment, the array of the white point on the test pattern is projected by the RGB three-color light source in the projection system, and further, whether there is a color convergence error in the RGB three-color light source can be judged by analyzing whether the light points of different colors projected by the RGB three-color light source superpose based on the projection result. In such a technical solution, the color convergence error of the projection system can be effectively detected and corrected, which is beneficial to improve the imaging quality of the projection system.

BRIEF DESCRIPTION OF THE DRAWINGS

In order to more clearly explain the embodiments of the present disclosure or the technical solutions in the prior art, the drawings used in the description of the embodiments or the prior art will be briefly introduced below. Obviously, the drawings in the following description are some embodiments of the present disclosure. For those of ordinary skill in the art, other drawings can be obtained based on these drawings without paying creative labor.

FIG. 1 is a flowchart of a method for correcting a color convergence error according to an embodiment of the present disclosure;

FIG. 2 is a schematic diagram of a test pattern according to an embodiment of the present disclosure;

DETAILED DESCRIPTION OF EXAMPLE EMBODIMENTS

Figure 3A:
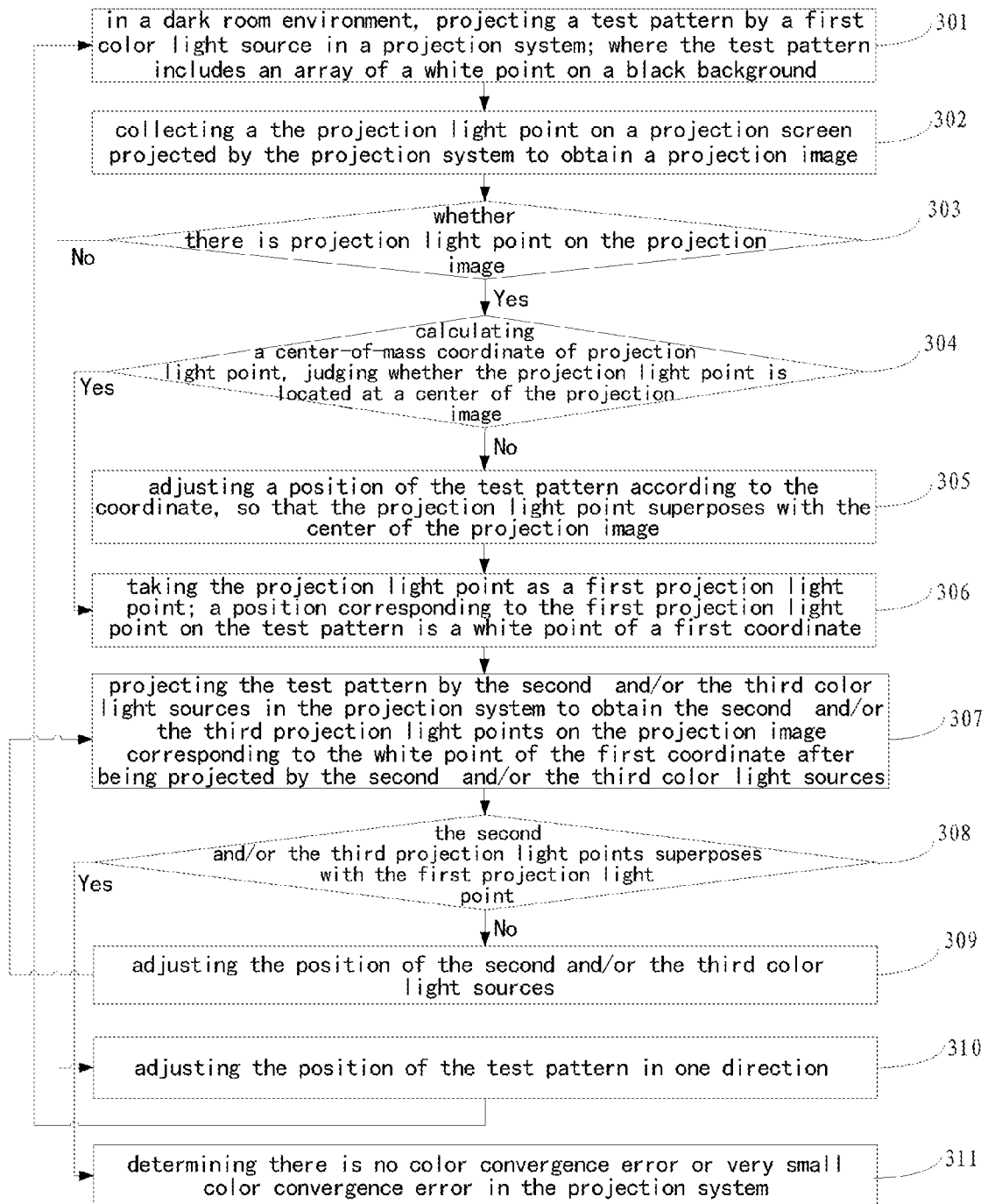
FIG. 3a is a flowchart of a method for correcting a color convergence error according to another embodiment of the present disclosure.

For making the purposes, technical solutions and advantages of the embodiments of the present disclosure clearer, the technical solutions in the embodiments of the present disclosure will be clearly and completely described below in combination with the drawings in the embodiments of the present disclosure. It is apparent that the described embodiments are not all embodiments but part of embodiments of the present disclosure. All other embodiments obtained by those of ordinary skill in the art on the basis of the embodiments in the present disclosure without creative work shall fall within the scope of protection of the present disclosure.

FIG. 1 is a flowchart of a method for correcting a color convergence error according to an embodiment of the present disclosure. As shown in FIG. 1, the method includes:

step 101: in a dark room environment, collecting a projection light point on a projection screen projected by a projection system, to obtain a projection image; where the projection system projects a test pattern containing an array of a white point by using RGB three-color light source;

step 102: adjusting the test pattern, so that a first projection light point corresponding to the white point of a first coordinate on the test pattern after being projected by a first color light source is located in a center of the projection image;

step 103: obtaining a second projection light point and/or a third projection light point corresponding to the white point of the first coordinate after being projected by a second color light source and/or a third color light source from the projection image; and step 104: adjusting an assembly parameter of the projection system according to a position of the second projection light point and/or the third projection light point and a position of the first projection light point.

In step 101, the test pattern used includes an array of a white point. If the projection system is disturbed by ambient stray light during imaging, the contrast of an image corresponding to the array of a white point after being projected may decrease, and the detection accuracy of color convergence error may reduce correspondingly. Therefore, when implementing the method for detecting a color convergence error according to the present disclosure, it is necessary to perform projection in a dark room environment and to shoot the projection light point in the dark room environment to avoid ambient light from interfering with the imaging effect of the projection system.

The test pattern used in this embodiment may be as shown in FIG. 2. On the test pattern, the gray value of the background is 0, and a plurality of white points with gray value 1 are arranged at a predetermined interval on the background.

The display component of the three-chip projection system includes the RGB three-color light source: a first color light source, a second color light source, and a third color light source. It should be understood that in the RGB three-color light source, the R light source may be the first color light source, the G light source may be the second color light source, and the B light source may be the third color light source; the R light source may be the second color light source, the G light source may be the third color light source, and the B light source may be the first color light source; and the R light source may be the third color light source, the G light source may be the first color light source, and the B light source may be the second color light source.

The test pattern contains the array of the white point. When the projection system displays the test pattern, the RGB three-color light source emits light at the same time. Ideally, when there is no color convergence error in the projection system, the pixel positions of the three different colors of red, green, and blue projected by the RGB three-color light source are accurately superposed. Therefore, in the next step, based on the location feature of the light point in the projection image, it can be determined whether the projection system has a color convergence error.

The projection light point received by the projection screen is the image point corresponding to the array of the white point on the test pattern after being projected by the projection system. The projection image refers to an image obtained by an image collecting device, such as a camera, taking the projection light point on a projection screen.

In step 102, the first projection light point is a light point contained in the projection image, and the light point is formed by projecting a white point on the test pattern by the first color light source. In this embodiment, the white point on the test pattern that can be projected by the first color light source to obtain the first projection light point is marked as the white point of the first coordinate. That is, the white point of the first coordinate on the test pattern and the first projection light point are the relationship between the object and the image. It should be understood that the first position coordinate is only used to limit the position feature on the test pattern of the white point corresponding to the first projection light point for ease of description, but in fact it does not limit which specific coordinate.

The first color light source is any one of the RGB three-color light source of the projection system. In this step, the first projection light point corresponding to the first color light source in the RGB three-color light source is preferentially placed in the center of the projection image for use in the subsequent steps to use the first projection light point as a fixed position reference object to determine whether the white point of the first position coordinate corresponding to the first projection light point is converged to the correct position after being projected by the second color light source and/or the third color light source.

The adjusting the test pattern refers to adjusting the position of the object corresponding to the projection system. For example, when the projection system is a three-chip reflection projection system, the position of the test pattern on the three display screens in the projection system can be adjusted at the same time. For another example, when the projection system is a laser scanning projection system, the position of the test pattern can be adjusted relative to the positions of the polygon mirror or galvanometer used for scanning the test pattern in the projection system. For example, the position of the test pattern is adjusted down by 1 cm. For another example, the position of the test pattern is adjusted to the right by 0.5 cm. As the adjusting of the position of the test pattern, the position of the projection light point received on the projection screen also changes. When the first projection light point is at the center of the projection image, the adjusting may stop.

Theoretically, when the error of the projection system is extremely small or non-existent, three projection light points corresponding to the white point of the first coordinate on the test pattern after being projected by the RGB three-color light source should superpose. Therefore, next, in step 103, the second projection light point and/or third projection light point corresponding to the white point of the first coordinate on the test pattern after being projected by the second color light source and/or the third color light source may continue to be obtained to analyze whether the three projection light points projected by the RGB three-color light source with regard to the white point of the first coordinate superpose.

In step 104, the position of the second projection light point and/or the third projection light point and the first projection light point refers to the relative positions of the three projection light points on the projection image. The first projection light point is located at the center of the projection image. When the positions of the second projection light point and/or the third projection light point and the position of the first projection light point have an offset, it can be considered that there is a certain error in the convergence of the red, green, and blue colors on the projection system. At this time, the assembly parameters of the projection system can be adjusted according to the relationship between the positions of the three projection light points to correct this error.

In this embodiment, in the dark room environment, the array of the white point on the test pattern is projected by the RGB three-color light source in the projection system, and further, whether there is a color convergence error in the RGB three-color light source can be judged by analyzing whether the light points of different colors projected by the RGB three-color light source superpose based on the projection result. In such a technical solution, the color convergence error of the projection system can be effectively detected and corrected, which is beneficial to improve the imaging quality of the projection system.

Optionally, the method for detecting the color convergence error according to the present disclosure can be applied to a variety of display systems based on RGB three-color light source imaging, such as a three-chip reflection/projection system based on RGB three-color light source, and a laser scanning display system based on RGB three-color light source, etc. The technical solution of the present disclosure will be illustrated by taking a three-chip reflection projection system as an example below.

In the three-chip reflection projection system, three display screens of red, green, and blue are usually used as the light source of the red, green, and blue light. During projection, three color lights of red, green, and blue are respectively used to illuminate the red, green, and blue display screens. After the three display screens are illuminated, they reflect respectively the three color lights containing image information. After undergoing the action of the prism, the three color lights converge, which is projected onto the projection screen by the projection lens to form a full-color image.

When testing the color convergence error, in the dark room environment, the screens corresponding to the red light, the green light, and blue light can be controlled to display the test pattern, the projection image is collected, and whether there is a red projection light point in the center of the projection image is determined. If no, the position of the test pattern on the display screen corresponding to the red, green, and blue lights at the same time, so that a red projection light point at the center of the projection image appears on the projection image. Next, the projection image is collected again, and the position of the green projection light point and the position of the blue projection light on the projection image corresponding to the white point after being projected by the screens corresponding to the green light and blue light corresponding to the red projection light point on the test pattern is determined. The location of the point. Then, by calculating the position offset of the red, green and blue projection light points, it can be judged whether there is a color convergence error in the projection system.

In the above embodiment, the display sequence of the RGB three-color light source with regard to the test pattern is not limited. In practice, the test pattern can be displayed by the RGB three-color light source at the same time, or displayed in a certain sequence. If the test pattern is displayed in a certain sequence, the mutual interference between the projection light points corresponding to the RGB three-color light source can be avoided, and the projection light points can be quickly and accurately shot on the projection screen.

The following embodiment will take the first color light source displaying the test pattern first, and after the first projection light point corresponding to the first color light source being determined, the projection pattern being displayed by the second color light source and the third color light source as an example to implement the technical solution provided by the embodiment of the present disclosure is explained in detail.

FIG. 3a is a flowchart of a method for correcting a color convergence error according to another embodiment of the present disclosure. As shown in FIG. 3a, the method includes:

step 301: in a dark room environment, projecting a test pattern by a first color light source in a projection system; where the test pattern includes an array of a white point on a black background;

step 302: collecting a the projection light point on a projection screen projected by the projection system to obtain a projection image;

step 303: determining whether there is projection light point on the collected projection image; if yes, going to step 304, and if no, going to step 310;

step 304: calculating a center-of-mass coordinate of the projection light point, and judging whether the projection light point is located at a center of the projection image according to the center-of-mass coordinate; if no, going to step 305, and if yes, going to 306;

step 305: adjusting a position of the test pattern according to the center-of-mass coordinate, so that the projection light point superposes with the center of the projection image;

step 306: taking the projection light point as a first projection light point; where a position corresponding to the first projection light point on the test pattern is a white point of a first coordinate;

step 307: projecting the test pattern by the second color light source and/or the third color light source in the projection system to obtain the second projection light point and/or the third projection light point on the projection image corresponding to the white point of the first coordinate after being projected by the second color light source and/or the third color light source;

step 308: judging whether the second projection light point and/or the third projection light point superposes with the first projection light point; if no, going to step 309;

step 309: adjusting the position of the second color light source and/or the third color light source, and going to step 307;

step 310: adjusting the position of the test pattern in one direction, and going to step 301; and step 311: determining there is no color convergence error or very small color convergence error in the projection system.

In step 301, the white point on the test pattern on the black background may be a white round point, a white cross point or other shapes of point, which are not limited in this embodiment. The white points are arranged according to a certain array pitch, and the value of the array pitch can be designed in advance according to the size of the photosensitive element on the camera that collects the projection image.

Optionally, in this embodiment, the camera can be controlled to capture the image point of only one white point on the test pattern on the projection screen, to prevent the projection image captured by the camera from containing multiple projection light points projected from the same display screen. When multiple projection light points affect each other, the accuracy of color convergence error analysis is reduced. Optionally, it can be designed that the minimum distance between two adjacent projection light points received by the projection screen is greater than the size of the photosensitive element on the camera. By this design, it can be ensured that the projection image captured by the camera contains only one projection light point. It should be noted that in the above or below embodiments of the present disclosure, the camera mentioned may be a camera that does not include a refractive lens.

Based on the above analysis, in an alternative embodiment, after determining the camera used to shoot the projection image, it can be determined the minimum distance between two adjacent projection light points received by the projection screen based on the size of the photosensitive element of the camera, such as CCD (Charge-coupled Device) or CMOS (Complementary Metal Oxide Semiconductor). Then, an array distance corresponding to the array of the white point on the test pattern can be designed reversely according to the minimum distance between the two projection light points, a magnification of the projection system, and a distance between the projection screen and the projection system.

Figure 3B:
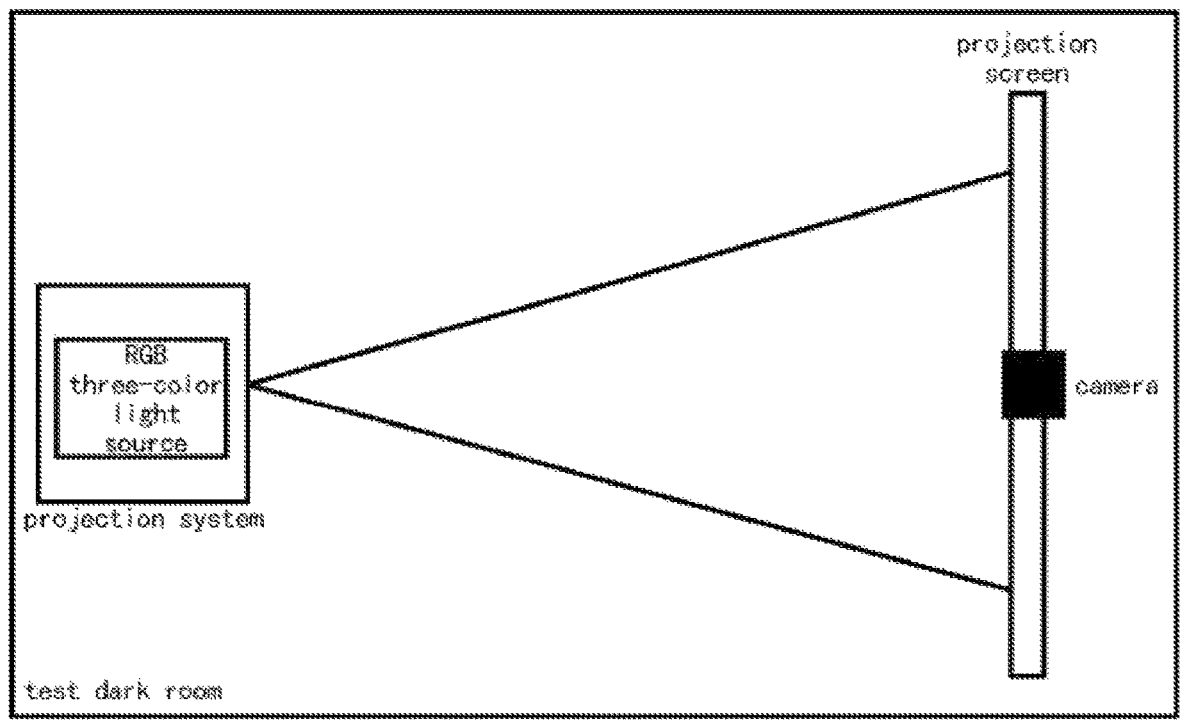
FIG. 3b is a schematic diagram of projecting and shooting a projection image according to an embodiment of the present disclosure.

In step 302, optionally, when collecting the projection light points from the projection screen, the camera can be placed on the projection screen at a position coaxial with the projection system, as shown in FIG. 3b.

In step 303, after the projection image is captured, the gray value of the pixels on the projection image can be detected to determine whether there is a projection light point on the projection image. If no, step 310 may be performed to adjust the position of the test pattern in one direction. The adjustment in one direction can be understood as adjustment in a horizontal direction, a vertical direction or an oblique direction. The test pattern includes an array of a white point, and the camera and the projection system are coaxial. When the position of the test pattern is continuously adjusted in one direction, the efficiency of the camera to capture the projection light point at the center of the projection image can be improved.

In step 304, if there is a projection light point on the projection image, then the center-of-mass coordinate of the projection light point is calculated, and whether the center-of-mass coordinate is the same as the coordinate of the center point of the projection image is judged. If the two coordinates are different, it can be determined that the projection light point is not at the center point of the projection image.

In step 305, if the projection light point is not at the center point of the projection image, an offset amount and an offset direction of the projection light point relative to the center point of the projection image can be calculated according to the center-of-mass coordinate of the projection light point and the coordinate of the center point of the projection image. Next, the position of the test pattern is adjusted based on the offset amount and the offset direction. For the specific adjustment method, refer to the record of the foregoing embodiment, which will not be repeated here.

In steps 306-307, if the projection light point is at the center point of the projection image, the projection light point is marked as the first projection light point. Then, the second color light source and/or the third color light source in the projection system is controlled to display the test pattern.

It should be understood that during the assembly process of the projection system, the hardware assembly error can be controlled within a certain range. The method for correcting the convergence error according to this embodiment is to further accurately adjust the color convergence after the hardware assembly error is reduced to a certain range. Optionally, after the hardware assembly error is controlled within a certain range, it can be considered that in the projection image captured by the camera, if the projection light point projected by one of the color light sources of the projection system is located in the center of the projection image, the camera can capture the projection light points projected by the other two color light sources, and the object points corresponding to the three projection light points captured are the same white point on the test pattern. That is to say, when the first projection light point is at the center of the projection image, the second projection light point and/or the third projection light point obtained by projecting after the white point of the first coordinate being displayed by the second color light source and/or the third color light source can also be captured by the camera.

Therefore, after controlling the second color light source and/or the third color light source in the projection system to project the test pattern, the second projection light point and/or the third projection light point corresponding to the white point of the first position after being projected by the first color light source and/or the second color light source can be obtained.

In step 308, the center-of-mass coordinates of the second projection light point and/or the third projection light point can be calculated and compared with the center-of-mass coordinate of the first projection light point to determine whether the second projection light point and/or third projection light point superposes with the first projection light point. If they superpose, step 311 can be performed to confirm that there is no color convergence error in the projection system, or the color convergence error is extremely small that it cannot be distinguished. Since the extremely small error has very little influence on the imaging quality and is not perceptible by the human eyes, it is not necessary to correct the projection parameter of the projection module.

In step 309, when the second projection light point and/or the third projection light point do not superpose with the first projection light point, it can be considered that in the three-chip projection system, there is a certain error in the assembly between the first color light source, the second color light source, and the third color light source. At this time, the positions of the second color light source and the third color light source can be adjusted based on the first color light source, and step 307 is continued after the adjustment, to analyze the color convergence error of the adjusted projection system.

In this embodiment, in the dark room environment, the array of the white point on the test pattern is projected by the RGB three-color light source in the projection system, and further, whether there is a color convergence error in the RGB three-color light source can be judged by analyzing whether the light points of different colors projected by the RGB three-color light source superpose based on the projection result. In such a technical solution, the color convergence error of the projection system can be effectively detected and corrected, which is beneficial to improve the imaging quality of the projection system.

It should be noted that the expressions herein of "first", "second", etc. are intended to distinguish between different messages, devices, modules, etc., and are not intended to represent a sequential order, nor is it intended to limit that "first" and "second" are of different types.

It is also to be noted that terms "include", "contain" or any other variants thereof are intended to include nonexclusive inclusions, thereby ensuring that a commodity or system including a series of elements not only includes those elements but also includes other elements which are not clearly listed or further includes elements intrinsic to the commodity or the system. Under the condition of no more restrictions, an element defined by statement "including a/an" does not exclude existence of another element which is the same in a commodity or system including the element.

Figure 4:
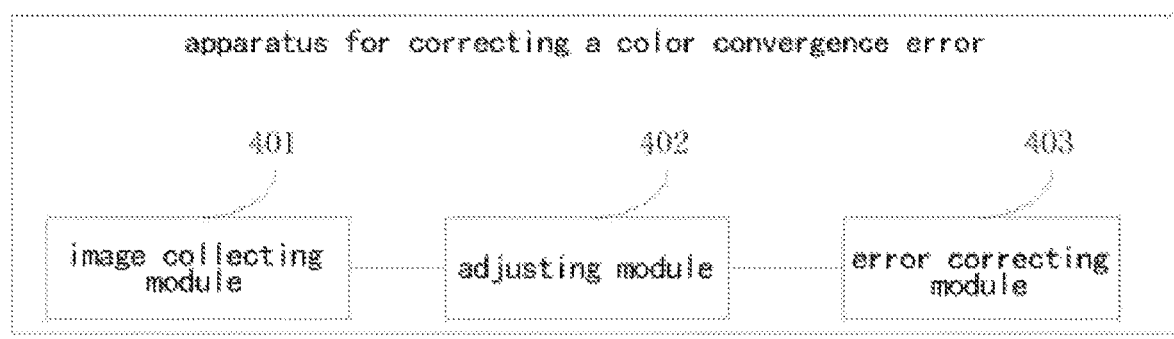
FIG. 4 is a schematic structural diagram of an apparatus for correcting a color convergence error according to an embodiment of the present disclosure.

The above describes alternative implementations of the method for correcting the color convergence error. As shown in FIG. 4, in practice, the method for correcting the color convergence error can be implemented by an apparatus for correcting a color convergence error, as shown in FIG. 4, the apparatus include:

an image collecting module 401, configured to collect a projection light point on a projection screen projected by a projection system, to obtain a projection image; wherein the projection system projects a test pattern containing an array of a white point by using RGB three-color light source; an adjusting module 402, configured to adjust the test pattern, so that a first projection light point corresponding to the white point of a first coordinate on the test pattern after being projected by a first color light source is located in a center of the projection image; the image collecting module 401, further configured to obtain a second projection light point and/or a third projection light point corresponding to the white point of the first coordinate after being projected by a second color light source and/or a third color light source from the projection image; and an error correcting module 403, configured to adjust an assembly parameter of the projection system according to a position of the second projection light point and/or the third projection light point and a position of the first projection light point.

Further optionally, the error correcting module 403 is specifically configured to: calculate a center-of-mass coordinate of the second projection light point and/or the third projection light point; judge whether the second projection light point and/or the third projection the light point superposes with the first projection light point according to the center-of-mass coordinate; and if no, adjust a position of the second color light source and/or the third color light source accordingly, so that the second projection light point and/or the third projection light point superposes with the first projection light point.

Further optionally, the image collecting module 401 is further configured to: before collecting the projection light point on the projection screen projected by the projection system, determine a minimum distance between two adjacent projection light points received by the projection screen according to a size of a photosensitive element on a camera collecting the projection image; and design reversely an array distance corresponding to the array of the white point on the test pattern according to the minimum distance between the two projection light points, a magnification of the projection system, and a distance between the projection screen and the projection system.

Further optionally, the minimum distance between two adjacent projection light points received by the projection screen is greater than the size of the photosensitive element on the camera.

Further optionally, the adjusting module 402 is specifically configured to: after the first color light source displays the test pattern, judge whether there is the first projection light point on the collected projection image; if yes, calculate the center-of-mass coordinate of the first projection light point, and judge whether the first projection light point is located at the center of the projection image according to the center-of-mass coordinate; and if no, adjust the test pattern according to the center-of-mass coordinate, so that the first projection light point superposes with the center of the projection image.

The above-mentioned apparatus for correcting the color convergence error can execute the method for correcting the color convergence error according to the embodiment of the present disclosure, and has the corresponding functional modules and beneficial effects of the execution method. For technical details that are not described in detail in this embodiment, refer to the method provided in the embodiment of the present disclosure, and will not be repeated.

The apparatus embodiments described above are merely illustrative, where the units described as separate components may or may not be physically separated, and the components displayed as units may or may not be physical units, i.e., may be located at a place, or may be distributed to multiple network units. Some or all of the modules may be selected according to actual needs to achieve the purpose of the scheme of this embodiment. Those of ordinary skill in the art can understand and implement without creative work.

Through the description of the above implementation modes, those skilled in the art can clearly understand that various implementation modes may be implemented by means of software and a necessary general hardware platform, and of course, by hardware. Based on such understanding, the essence of the foregoing technical solutions or portions making contribution to the prior art may be embodied in the form of software products. The computer software products may be stored in a computer-readable storage medium such as a ROM/RAM, a magnetic disk and an optical disc, including instructions for causing a computer device (which may be a personal computer, a server, or a network device, etc.) to perform the methods described in various embodiments or portions of the embodiments.

Finally, it should be noted that the above embodiments are only used to illustrate the technical solutions of the present disclosure, and are not limited thereto. Although the present disclosure has been described in detail with reference to the foregoing embodiments, those of ordinary skill in the art will understand that the technical solutions described in the foregoing embodiments can be still modified, or some technical features are equivalently replaced. These modifications or replacements do not make the essence of the corresponding technical solutions depart from the spirit and scope of the technical solutions in various embodiments of the present disclosure.

What is claimed is:

1. A method for correcting a color convergence error, comprising:
   in a dark room environment, collecting a projection light point on a projection screen projected by a projection system, to obtain a projection image; wherein the projection system projects a test pattern containing an array of a white point by using RGB three-color light source; wherein the RGB three-color light source comprises a first color light source, a second color light source and a third color light source;
   adjusting the test pattern to make a first projection light point corresponding to a white point with a first coordinate on the test pattern after being projected by a first color light source be located in a center of the projection image; wherein the first projection light point is any one of projection light points on the projection image;
   obtaining a second projection light point and/or a third projection light point corresponding to the white point with the first coordinate after being projected by a second color light source and/or a third color light source from the projection image; and
   adjusting an assembly parameter of the projection system according to a position of the second projection light point and/or the third projection light point and a position of the first projection light point.

2. The method according to claim 1, wherein before the collecting the projection light point on the projection screen projected by the projection system, the method further comprises:
   determining a minimum distance between two adjacent projection light points received by the projection screen according to a size of a photosensitive element on a camera collecting the projection image; and
   designing reversely an array distance corresponding to the array of the white point on the test pattern according to the minimum distance between the two projection light points, a magnification of the projection system, and a distance between the projection screen and the projection system.

3. The method according to claim 2, wherein the adjusting the test pattern to make the first projection light point corresponding to the white point with the first coordinate on the test pattern after being projected by the first color light source be located in the center of the projection image comprises:
   after the first color light source displays the test pattern, judging whether there is the first projection light point on the collected projection image;
   if yes, calculating the center-of-mass coordinate of the first projection light point, and judging whether the first projection light point is located at the center of the projection image according to the center-of-mass coordinate; and
   if no, adjusting the test pattern according to the center-of-mass coordinate, so that the first projection light point superposes with the center of the projection image.

4. The method according to claim 1, wherein the adjusting the test pattern to make the first projection light point corresponding to the white point with the first coordinate on the test pattern after being projected by the first color light source be located in the center of the projection image comprises:

after the first color light source displays the test pattern, judging whether there is the first projection light point on the collected projection image;

if yes, calculating the center-of-mass coordinate of the first projection light point, and judging whether the first projection light point is located at the center of the projection image according to the center-of-mass coordinate; and if no, adjusting the test pattern according to the center-of-mass coordinate, so that the first projection light point superposes with the center of the projection image.

5. An apparatus for correcting a color convergence error, comprising:

an image collecting module, configured to collect a projection light point on a projection screen projected by a projection system, to obtain a projection image; wherein the projection system projects a test pattern containing an array of a white point by using RGB three-color light source; wherein the RGB three-color light source comprises a first color light source, a second color light source and a third color light source;

an adjusting module, configured to adjust the test pattern to make a first projection light point corresponding to a white point with a first coordinate on the test pattern after being projected by a first color light source be located in a center of the projection image; wherein the first projection light point is any one of projection light points on the projection image;

the image collecting module, further configured to obtain a second projection light point and/or a third projection light point corresponding to the white point with the first coordinate after being projected by a second color light source and/or a third color light source from the projection image; and an error correcting module, configured to adjust an assembly parameter of the projection system according to a position of the second projection light point and/or the third projection light point and a position of the first projection light point.

6. The apparatus according to claim 5, wherein the error correcting module is specifically configured to:

calculate a center-of-mass coordinate of the second projection light point and/or the third projection light point;

judge whether the second projection light point and/or the third projection the light point superposes with the first projection light point according to the center-of-mass coordinate; and if no, adjust a position of the second color light source and/or the third color light source accordingly, so that the second projection light point and/or the third projection light point superposes with the first projection light point.

7. The apparatus according to claim 5, wherein the image collecting module is further configured to:

before collecting the projection light point on the projection screen projected by the projection system, determine a minimum distance between two adjacent projection light points received by the projection screen according to a size of a photosensitive element on a camera collecting the projection image; and design reversely an array distance corresponding to the array of the white point on the test pattern according to the minimum distance between the two projection light points, a magnification of the projection system, and a distance between the projection screen and the projection system.

8. The apparatus according to claim 5, wherein the adjusting module is specifically configured to:

after the first color light source displays the test pattern, judge whether there is the first projection light point on the collected projection image;

if yes, calculate the center-of-mass coordinate of the first projection light point, and judge whether the first projection light point is located at the center of the projection image according to the center-of-mass coordinate; and if no, adjust the test pattern according to the center-of-mass coordinate, so that the first projection light point superposes with the center of the projection image.

9. The apparatus according to claim 6, wherein the adjusting module is specifically configured to:

after the first color light source displays the test pattern, judge whether there is the first projection light point on the collected projection image;

if yes, calculate the center-of-mass coordinate of the first projection light point, and judge whether the first projection light point is located at the center of the projection image according to the center-of-mass coordinate; and if no, adjust the test pattern according to the center-of-mass coordinate, so that the first projection light point superposes with the center of the projection image.

10. The apparatus according to claim 7, wherein the adjusting module is specifically configured to:

after the first color light source displays the test pattern, judge whether there is the first projection light point on the collected projection image;

if yes, calculate the center-of-mass coordinate of the first projection light point, and judge whether the first projection light point is located at the center of the projection image according to the center-of-mass coordinate; and if no, adjust the test pattern according to the center-of-mass coordinate, so that the first projection light point superposes with the center of the projection image.

\* \* \* \* \*